United States Patent [19]
Jones

[11] Patent Number: 5,510,089
[45] Date of Patent: * Apr. 23, 1996

[54] METHOD FOR OPERATING A DISTILLATION COLUMN REACTOR

[75] Inventor: Edward M. Jones, Friendswood, Tex.

[73] Assignee: Chemical Research & Licensing Company, Pasadena, Tex.

[*] Notice: The portion of the term of this patent subsequent to Mar. 30, 2010, has been disclaimed.

[21] Appl. No.: 968,393

[22] Filed: Oct. 29, 1992

Related U.S. Application Data

[62] Division of Ser. No. 733,654, Jul. 22, 1991, Pat. No. 5,198,196.

[51] Int. Cl.$^6$ ............................................. B01J 8/08
[52] U.S. Cl. ..................... 422/189; 422/190; 422/191; 422/213; 422/219; 422/233; 422/261
[58] Field of Search ................................. 422/189, 190, 422/191, 192, 213, 219, 233, 261

[56] References Cited

U.S. PATENT DOCUMENTS

| | | | |
|---|---|---|---|
| 3,547,809 | 8/1968 | Ehrlich et al. | 422/189 |
| 3,761,521 | 9/1973 | Alheritiere et al. | 422/225 |
| 4,046,516 | 9/1977 | Burton et al. | 422/190 |
| 4,215,011 | 7/1980 | Smith, Jr. | 252/426 |
| 4,242,530 | 12/1980 | Smith, Jr. | 585/510 |
| 4,336,407 | 6/1982 | Smith, Jr. | 568/697 |
| 4,439,350 | 3/1984 | Smith, Jr. | 502/527 |
| 4,443,559 | 4/1984 | Jones, Jr. | 502/527 |
| 4,471,154 | 9/1984 | Franklin | 422/140 |
| 4,475,005 | 10/1984 | Paret | 568/647 |
| 4,536,373 | 8/1985 | Jones, Jr. | 422/211 |
| 4,551,567 | 11/1985 | Smith, Jr. | 568/907 |
| 4,774,364 | 9/1988 | Chou | 568/697 |
| 4,847,430 | 7/1989 | Quang et al. | 203/DIG. 6 |

FOREIGN PATENT DOCUMENTS

| | | |
|---|---|---|
| 1075613 | 2/1960 | Germany . |
| 2096603 | 10/1982 | United Kingdom . |
| 2096604 | 10/1982 | United Kingdom . |

OTHER PUBLICATIONS

Spes, Hellmuth, "Catalytic Reactions in Ion Exchange Columns while Displacing the Chemical Equlibrium", Chemiker–Zeitung Chemische Apparatus, vol. 90, No. 13, 1966.

*Primary Examiner*—Robert J. Warden
*Assistant Examiner*—Hien Tran
*Attorney, Agent, or Firm*—Kenneth H. Johnson

[57] ABSTRACT

A method is provided for removing catalyst from a distillation column reactor and replacing the catalyst with fresh or regenerated catalyst. More specifically a small particulate catalyst is supported by wire mesh or screen or filter medium on trays in a conventional distillation column and substantially submerged by the liquid on the trays. The vapor rising through the liquid tends to keep the catalyst in suspension in the liquid. A draw-off is provided for each tray having catalyst supported thereon whereby liquid containing the suspended or slurried catalyst can be removed to a separator during operation. The catalyst is separated, as in a settling tank separator, from the liquid recycled to the tray until all the catalyst has been removed. The separated catalyst is removed for either regeneration or discarding. Fresh catalyst can then be added to the separator where it is slurried into the liquid again being recirculated from the tray. The trays can all be connected to the same separator/slurry mixer by the appropriate piping and manifolds.

1 Claim, 2 Drawing Sheets

METHOD FOR OPERATING A DISTILLATION COLUMN REACTOR

This is a division of application Ser. No. 07/733,654, filed Jul. 22, 1991, which has issued as U.S. Pat. No. 5,198,196.

BACKGROUND OF THE INVENTION

The use of catalyst in a distillation column to concurrently carry out chemical reactions and separate the reaction products has been practiced for some time. This use of a catalytic distillation column reactor lends itself particularly well for reversible reactions in the liquid phase. See for example U.S. Pat. No. 4,336,407 (etherification), U.S. Pat. No. 4,482,775 (isomerization), U.S. Pat. No. 4,242,530 (separation of isobutene from $C_4$ streams) and U.S. Pat. No. 4,551,567 (deetherification). The combination is useful because the reactants, in the liquid phase are quickly separated from the reaction products due to boiling point differences by fractional distillation. Thus the reverse reaction is suppressed.

There have been disclosed several different arrangements to achieve the desired result. For example British Patents 2,096,603 and 2,096,604 disclose placing the catalyst on conventional trays within a distillation column. A series of U.S. patents, including those listed above commonly assigned with the instant invention discloses using the catalyst as part of the packing in a packed distillation column. More particularly U.S. Pat. Nos. 4,443,559 and 4,215,011 exemplify the latter.

Where the catalyst is used as distillation packing, it is usually contained in some cloth belt or wire mesh baskets. Additionally U.S. Pat. Nos. 4,443,559 and 4,215,011 disclose a particulate resin catalyst contained in pockets on a cloth belt. The cloth belt is arranged and supported in the column by wire mesh intimately associated with the cloth pockets. U.S. Pat. Nos. 4,439,350 and 4,536,373 disclose apparatus for placing the cloth belts containing the catalyst on conventional distillation column trays.

It is generally recognized that ion exchange resin catalyst must be in small particulate form. See for example, "Catalytic reaction in Ion Exchange Columns Whilst Displacing the Chemical Equilibrium," *Chemiker-Zeitung/Chemische Apparatur,* Vol. 90, Nov. 13, 1966, and German Patent 1,075,613. The small particulate form necessitates the bags or wire mesh containers in order to prevent undue pressure drop and provide sufficient space for liquid/vapor flow in the column.

While ion exchange resins have many applications as catalysts, in some applications they become deactivated quickly. Additionally, the catalyst may age at different rates up and down the column. At some point in time the catalyst, or some portion of it, must be replaced or regenerated. In all prior arrangements the distillation column must be shut down, either for regeneration in situ or for removal of the deactivated catalyst. Removal and replacement of the catalyst can be cumbersome and time consuming even though provision may be made for removing and replacing only a portion of the catalyst.

The inventor has thus seen a need for a method and apparatus for removing and replacing catalyst without stopping operation. Such a method and apparatus would make many more applications of ion exchange resin catalysts economically feasible.

SUMMARY OF THE INVENTION

In the broader aspect of the invention there is provided a method and apparatus for removing catalyst from a distillation column reactor and replacing the catalyst with fresh or regenerated catalyst. More specifically a small particulate catalyst is supported by wire mesh or retained by cages on trays in a conventional distillation column and completely submerged by the liquid on the trays. The vapor rising through the liquid tends to keep the catalyst in suspension in the liquid. A draw-off is provided for each tray having catalyst supported thereon whereby liquid containing the suspended or slurried catalyst can be removed to a separator during operation. The catalyst is separated, as in a settling tank separator, from the liquid and the liquid recycled to the tray until all the catalyst has been removed. The separated catalyst is removed for either regeneration or discarding. Fresh catalyst can then be added to the separator where it is slurried into the liquid again being recirculated from the tray. The trays can all be connected to the same separator/slurry mixer by the appropriate piping and manifolds.

More specifically the present distillation column reactor for concurrently carrying out chemical reactions and separating by fractional distillation the reactants and reaction products, comprising:

(a) a distillation column having a plurality of suitable liquid-vapor contact trays;

(b) catalyst loosely supported on at least a portion of said trays to the depth of the liquid on said trays;

(c) first means to withdraw the liquid on said trays carrying said catalyst from said trays;

(d) second means to separate said catalyst from said liquid and return said liquid less said catalyst to said trays;

(e) third means to replace said catalyst with a second catalyst and mix said second catalyst with said liquid and to return said liquid with said second catalyst to said trays.

Because the catalyst agitation may generate "fines" by physical attrition which can trickle down through the trays and build up in the bottom of the reactor, there is also provided a liquid withdrawal with filter in the lower end of the distillation column reactor. A draw-off is provided on the catch screen to remove these "fines" without shutting down operation thus preventing undue pressure drop in the column and unwanted reactions.

In the above manner catalyst on individual trays can be replaced to optimize operation of the distillation column reactor without shut down and loss of on stream time.

DETAILED DESCRIPTION OF THE PREFERRED EMBODIMENT

For a detailed description of the preferred embodiment of the present invention the reader is directed to the accompanying figures for illustration purposes.

Figure 1:
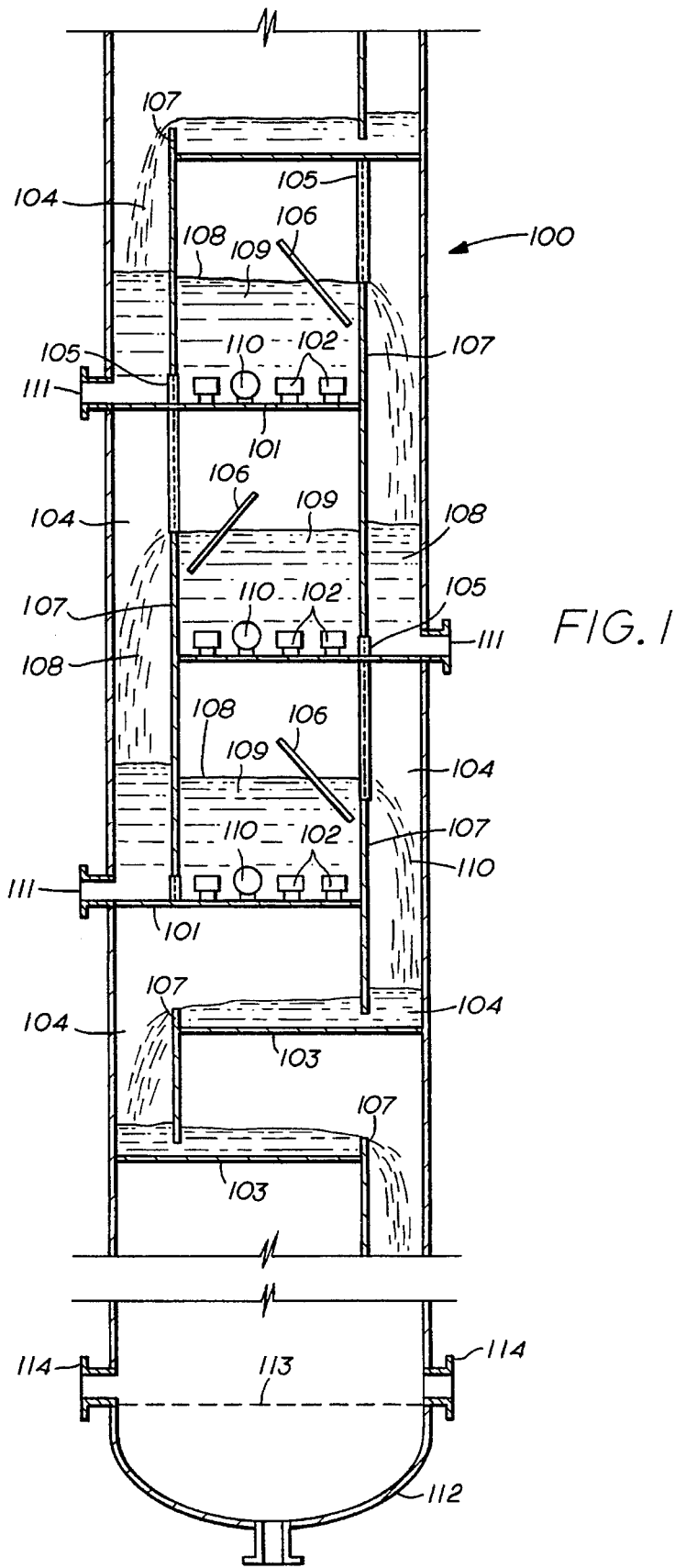
FIG. 1 is a partial sectional view of a distillation column reactor showing trays having catalyst supported thereon.

Referring first to FIG. 1 there is shown a portion of a distillation column reactor 100 having conventional distillation trays 101 and 103 therein. Each tray, either 101 or 103, include overflow weirs 107 and downcomers 104. The trays 101 all have small particulate catalyst 109, such as an acid ion exchange resin, supported thereon and contained in liquid 108. Screens 105 cover the downcomer inlet to the trays 103 which contain the catalyst 109 to prevent the catalyst 109 from entering the downcomer. The screens 105 may be extended downward to the overflow weirs 107 on those trays having catalyst to prevent the catalyst 109 from overflowing into the downcomer. Additionally diagonal stilling baffles 106 are provided to prevent the catalyst 109 from clogging the overflow screen.

On those trays 103 containing catalyst spargers 102 having screens are provided to prevent catalyst 109 from trickling down the column through the vapor spaces on the trays. The spargers 102 also insure good vapor liquid contact and aid in keeping the catalyst suspended in the liquid on the trays. Each tray having catalyst supported thereon includes a catalyst slurry draw-off/return 110 at a minimum height on the tray above the floor of the tray. A clear liquid draw-off/return 111 is also provided in the downcomer.

Included in the bottom 112 of the column is a liquid draw off with a filter 113 for catching any catalyst "fines" which may be generated by agitation of the resin on the trays. Draw-off 114 is provided to remove these fines to prevent build up of excess pressure drop in the column. Alternatively the liquid bottoms may be removed to an external circulation pump and external filter (not shown). Thus, the filter can be cleaned with out having to go inside the column.

Figure 2:
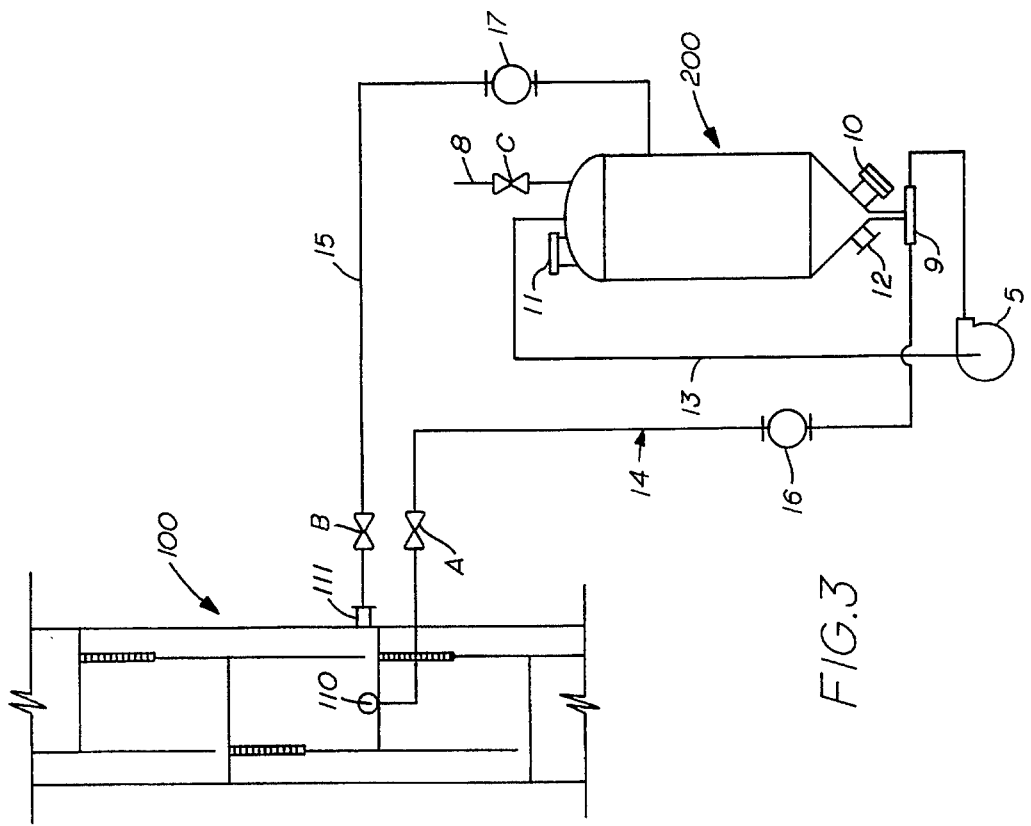
FIG. 2 is a flow diagram showing the vessels and piping arrangement for removing catalyst from trays.
Figure 3:
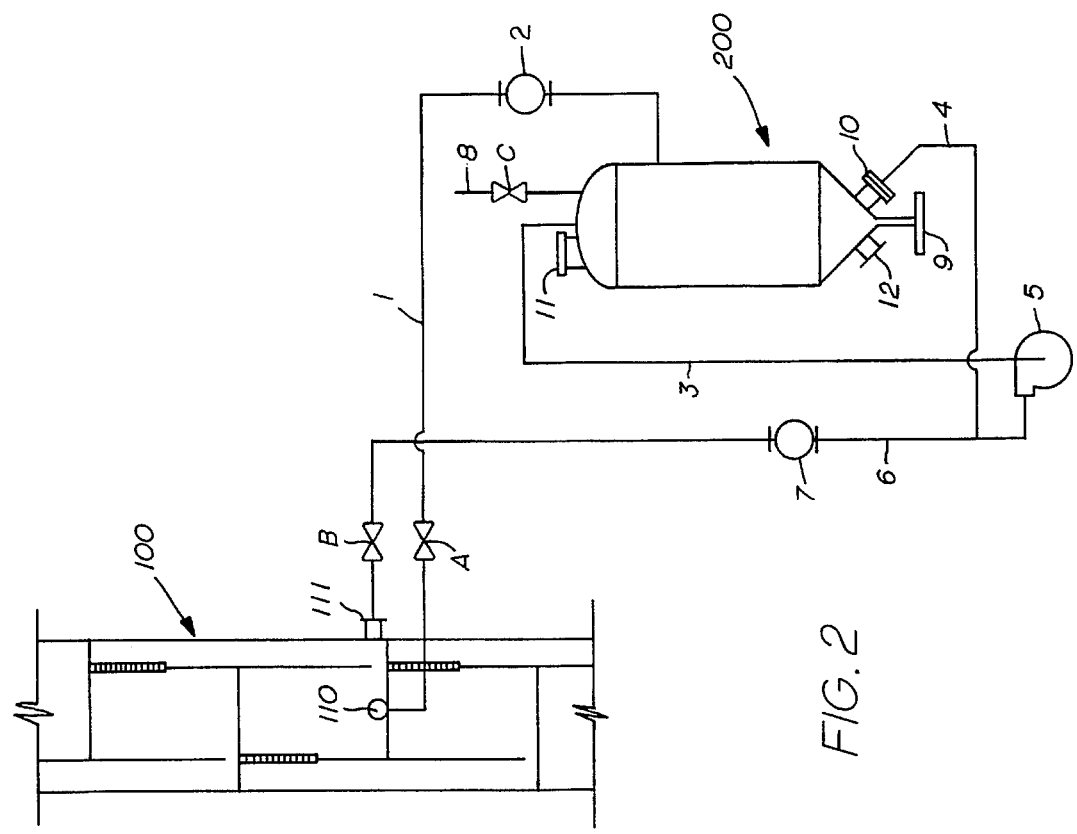
FIG. 3 is a flow diagram showing the vessels and piping arrangement for replacing the catalyst on the trays.

Referring now to FIGS. 2 and 3 there are shown schematic flow diagrams of typical piping and vessels to achieve the removal and replacement of the catalyst on the trays. For illustration purposes only one tray is shown and individual lines for achieving the draw-off and return in the separate operation. In practice manifolds and cross over piping would be provided to reduce the expense of installation.

FIG. 2 shows the arrangement for removing catalyst from the tray. The catalyst slurried on the tray is removed through nozzle 110 and valve A via line 1 through sight glass 2 to separator generally depicted at 200. The separator may be of conventional design to allow settling of the solid catalyst from the liquid. Liquid is withdrawn from the top of separator 200 via line 3 to the suction side of pump 5 where it is pumped back to the clear liquid inlet through valve B via line 6. Liquid is continually recirculated to and from the tray until no more catalyst can be seen in sight glass 7 indicating that all the catalyst has been removed from the tray and settled out in separator 200.

After the catalyst has been removed from the tray, the hopper outlet 12 on separator 200 may be opened and the bulk of the solid catalyst removed. The separator can then be pressured up, as with nitrogen, through line 8 and valve C to blow the remaining liquid in the separator through screen 10 and line 4 and 6 back to the tray. The screen 10 removes any remaining catalyst from the liquid.

Referring now to FIG. 3 the arrangement for replacing the catalyst is shown. The replacement catalyst is placed into the separator 200 through fill opening 11, and the opening closed. The separator 200 is then slowly filled with clear liquid from the tray from nozzle 111 through valve B via line 15 having an in line sight glass 17. Liquid is withdrawn through line 13 to the suction side of pump 5, the discharge side which is now connected to eductor 9 attached to lower end of separator 200. The pumped liquid is slurried with catalyst in eductor 9 and returned to the tray return nozzle 110 via line 14 through sight glass 16 and valve A. When sight glass 16 is clear of catalyst the tray has been refilled. The remaining liquid in the separator 200 may be pressured back to the tray using nitrogen under pressure through line 8 through valve C.

As noted above, with the appropriate cross over piping and valves, some lines may be used in the different services for the different operations of removing and replacing the catalyst.

The foregoing description of the invention has been directed to a particular preferred embodiment of the present invention for purposes of explanation and illustration. It will be apparent to those skilled in the art that many modifications and changes in the apparatus may be made without departing from the scope and spirit of the invention. It is, therefore, intended that the following claims cover all equivalent modifications and modifications as fall within the scope of the invention as defined by the claims.

The invention claimed is:

1. A method for carrying out heterogeneous catalytic reactions comprising the steps of:
   a. supporting a solid particulate catalyst on trays in a distillation column reactor;
   b. feeding a stream containing at least one reactant to said distillation column reactor;
   c. concurrently in said distillation column reactor;
      (i) contacting said stream with said catalyst to react at least a portion of said reactant to form a reaction mixture containing reactant and products, and
      (ii) separating reactant from products by fractional distillation while maintaining a liquid level over said catalyst;
   d. replacing said solid particulate catalyst on any of said trays by:
      (i) withdrawing liquid from any of said trays through a conduit, said liquid containing solid particulate catalyst to a separator to separate the solid particulate catalyst from the liquid as by settling to define a clear liquid and recirculating the clear liquid to the tray until all of the solid particulate catalyst has been removed from the tray, and
      (ii) withdrawing clear liquid from any of the trays in which catalysts had been separated and slurrying replacement catalyst in said withdrawn clear liquid and recirculating the slurried catalyst and liquid to the tray until all the catalyst has been replaced on the tray.

* * * * *